United States Patent
Grady et al.

(10) Patent No.: US 9,464,917 B2
(45) Date of Patent: Oct. 11, 2016

(54) METHOD AND SYSTEM OF READING UTILITY METER DATA OVER A NETWORK

(75) Inventors: Brian Douglas Grady, Mountain View, CA (US); Raj Vaswani, Portola Valley, CA (US); James Pace, San Francisco, CA (US)

(73) Assignee: SILVER SPRING NETWORKS, INC., Redwood City, CA (US)

( * ) Notice: Subject to any disclaimer, the term of this patent is extended or adjusted under 35 U.S.C. 154(b) by 643 days.

(21) Appl. No.: 11/880,104

(22) Filed: Jul. 18, 2007

(65) Prior Publication Data

US 2009/0079584 A1    Mar. 26, 2009

(51) Int. Cl.
| | |
|---|---|
| G08B 23/00 | (2006.01) |
| G08C 15/06 | (2006.01) |
| G08C 19/22 | (2006.01) |
| H04Q 9/00 | (2006.01) |
| G01R 19/00 | (2006.01) |
| G01R 15/00 | (2006.01) |
| G01D 4/00 | (2006.01) |

(52) U.S. Cl.
CPC .............. *G01D 4/004* (2013.01); *Y02B 90/242* (2013.01); *Y02B 90/246* (2013.01); *Y04S 20/322* (2013.01); *Y04S 20/42* (2013.01)

(58) Field of Classification Search
USPC ................. 702/62; 370/235, 236; 445/13.1
See application file for complete search history.

(56) References Cited

U.S. PATENT DOCUMENTS

| | | | | |
|---|---|---|---|---|
| 6,073,169 | A * | 6/2000 | Shuey et al. | 340/870.02 |
| 6,100,817 | A * | 8/2000 | Mason et al. | 340/870.02 |
| 6,778,099 | B1 * | 8/2004 | Meyer et al. | 340/870.02 |
| 6,889,271 | B1 | 5/2005 | Germer et al. | |
| 6,933,857 | B2 | 8/2005 | Foote | |
| 7,271,735 | B2 * | 9/2007 | Rogai | 340/870.02 |
| 7,583,203 | B2 * | 9/2009 | Uy et al. | 340/870.02 |
| 2001/0038343 | A1 * | 11/2001 | Meyer et al. | 340/870.02 |
| 2005/0132115 | A1 * | 6/2005 | Leach | 710/305 |
| 2006/0091877 | A1 | 5/2006 | Robinson et al. | |
| 2007/0211401 | A1 * | 9/2007 | Mak | 361/119 |

OTHER PUBLICATIONS

E. Beroset, "An Overview of ANSI C12.22," *Electric Energy Online Magazine* [XP002517333] —URL: http://www.electricenergyonline.com—retrieved Feb. 27, 2009.

Office Action issued Jun. 9, 2012 in corresponding Russian Application No. 2009144104, and English translation thereof.

Office Action issued Jul. 17, 2012 in corresponding Mexican Application No. MX/a/2009/012656.

Office Action issued Jul. 2, 2013 in corresponding Philippines Application No. 1/2009/502157.

* cited by examiner

*Primary Examiner* — Muhammad N Edun
*Assistant Examiner* — Jerold Murphy
(74) *Attorney, Agent, or Firm* — Buchanan Ingersoll & Rooney PC

(57) ABSTRACT

A utility meter may be read by sending a request to read the meter from a meter reading application, which may be located on a utility server or on an access point to a network, to a communications module associated with the utility meter. The communications module initiates a session with the utility meter, makes requests for data from the associated utility meter, receives the responses to requests for data from the utility meter, and terminates the session after receiving all the requested data from the meter. It then formats the responses with the data received from the utility meter, and transmits the formatted response to the meter reading application.

26 Claims, 4 Drawing Sheets

METER-READING REQUEST/RESPONSE EXAMPLE

ANNOTATED RESPONSE - EXAMPLE

METHOD AND SYSTEM OF READING UTILITY METER DATA OVER A NETWORK

FIELD OF THE INVENTION

The present invention relates to utility networks and, more particularly, to a system and method of operating a utility network management system for reading of utility meters.

BACKGROUND

C12.19 is an ANSI standard for extracting and organizing electric utility meter data in a tabular form, and the information arranged in a specific format to facilitate further processing.

C12.18 is an ANSI protocol specification for a transport session between a server (identified as meter-reading application) and a client C12.19 utility meter, and includes making requests to and receiving from a C12.19 meter specific aspects of the data contained in the C12.19 data tables, stored in the meter.

SUMMARY OF THE INVENTION

A utility meter may be read by sending a request to read the meter from a meter reading application, which may be located on a utility server or on an access point to a network, to a communications module associated with the utility meter. The communications module initiates a session with the utility meter, makes requests for data from the associated utility meter, receives the responses to requests for data from the utility meter, terminate the session after all the requested data is received. It then formats the data received by the utility meter, and transmits the formatted response to the meter reading application.

In one preferred embodiment, protocols using the ANSI standards C12.18 and C12.19 are used. The communications module opens a C12.18 session with the associated utility meter and makes requests for data from the meter to fulfill the request to read the meter from a meter reading application. The associated meter provides data to the communications module according to the C12.19 standard. The communications module formats the received meter data into a response intended for the meter reading application and transmits the formatted response to the meter reading application. The meter data is formatted to allow the meter reading application to read and interpret the data, and is formatted according to the C12.19 standard.

BRIEF DESCRIPTION OF THE DRAWINGS

The foregoing aspects and many of the attendant advantages of this invention will become more readily appreciated and becomes better understood by reference to the following detailed description, when taken in conjunction with the accompanying drawings, wherein.

DETAILED DESCRIPTION OF THE INVENTION

Figure 1:
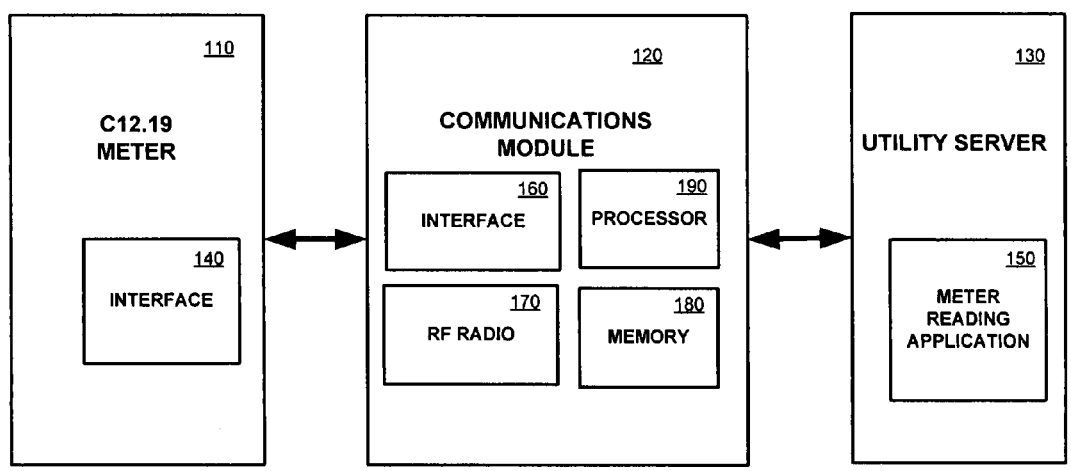
FIG. 1 is a block diagram illustrating a utility network over which the meter reading process may be implemented, according to one possible embodiment.

FIG. 1 is a generalized block diagram illustrating a system where a utility meter 110 may be "read" by a remote device. Unless otherwise noted, the term "read" or "reading" of a meter refers to the collection of information from the meter, which may include information on the commodity and utility meters, or it may include other information, or both. The utility meter 110 typically includes a hardware interface 140 to which a POTS modem, optical coupler or some other serial devices like a communications module 120 may be connected to. The communications module 120 may include utility meter interface 160, an RF radio 170, memory 180 for storing computer readable instructions, and a processor 190 for processing computer readable instructions. The utility meter measures, or meters, a commodity provided by a utility, for example electricity, gas, water, etc. In one possible embodiment, the communications module 120 is integrated with the utility meter. In yet another possible embodiment, the communications module is a separate module which interfaces with the utility meter. In the presently preferred embodiment, the communications module includes an RF radio capable of communicating with one or more remote devices, such as a remote utility server. The communications module may be part of a wireless network, such as a local area network (LAN), and may preferably have a two-way data communications link with the utility network server via an access point (also referred to as a gateway) which provides the egress/ingress support. An access point or utility server 130 may include the meter-reading application and initiate a networked session (for example, a C12.18 session) with the meter via the communications module. It is over the serial interconnect that the C12.18 sessions may be conducted between the communications module and the C12.19 meter. The communications module may also be referred to as the "meter access device." In one preferred embodiment, the communications module is a network interface card (NIC) which provides communication between the associated meter and the communications network. The communications module may also be referred to as a utility network node. Unless otherwise noted, the term utility network node refers to the combined communications module and associated utility meter, or may refer to the communications module without the utility meter when specified.

Figure 2:
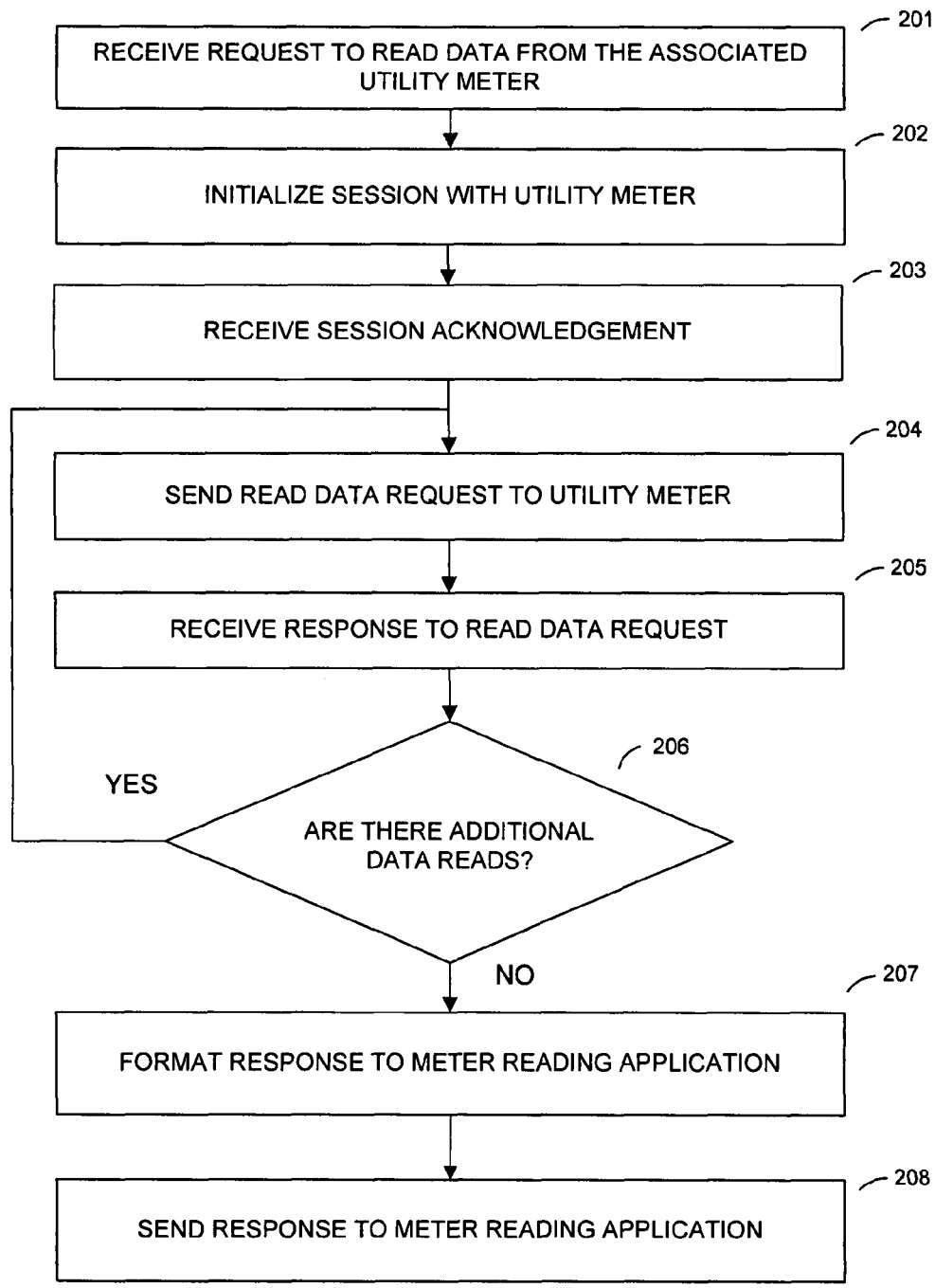
FIG. 2 is a flow diagram of process of responding to a meter reading request, according to one possible embodiment.

While only one communication module and one utility meter is illustrated in FIG. 1, alternate embodiments may have more than one communication module and more than one utility meter, and they may be organized into multiple networks and/or accessible through one or more access points. Additionally, there may be one or more utility servers, accessible through one or more networks, FIG. 2 is a generalized flow diagram illustrating the process 200 of responding to a request for data. At step 201 a communications module associated with a utility meter receives a request from the meter-reading application in the server or the access point to read utility meter for data. In response to the request to read data from the associated utility meter, the communications module initializes a session with the utility meter at step 202, which can be at any time after the request is received and in conformity with any timing deadlines established by the meter reading application to receive a response. At step 203 the utility meter acknowledgment the session initialization is received. At step 204 the communications module sends a data read request to the utility meter. At step 205 communications module receives the utility meter response to the data read request. The response may include the data requested, or may include one or more messages, for example an error message or some other message. At step 206 the communications module determines whether there are additional data reads. If there are additional data reads, the process proceeds to step 204 where a data read request is sent to the associated utility meter. If at step 206 it is determined that there are no additional data reads to be performed, the process proceeds to step 207. At step 207 the communications module sends a session termination message to the associated utility meter. At step 208 the utility meter acknowledgment of the session end is received by the communications module. At step 209 the communications module formats a response to the meter reading application. At step 210 the communications module responds to the request for data received at step 201 by sending a response to the received request to read the associated utility meter. In the presently preferred embodiment, the response includes information with suitable annotations to allow a meter reading application to associate the response with the corresponding request for data. Additionally or alternatively, the response may include information which allows the meter reading application to interpret the data. One example of a possible request and response is discussed more fully below in connection with FIG. 4.

The typical process of a meter reading application in a utility server initiating a C12.18 session with a C12.19 meter is a drain on network resources. The C12.18 protocol specifies a continuous on-net session during the whole meter reading process, requiring the transport connection to be maintained during the whole session. The session commences with the initialization process message from the server meter reading application to the meter via the communications module. The communication module here as acting simply as a passive relay between the meter-reading application and the meter. As the instructions continue from the server to the communications module, the communications module executes the requested data collection action with the meter. A request and response process is followed until the session is terminated by the termination message from the server to the communications module. By obtaining meter information blocks by specific identification requests (std 0, std 63, std 64, etc), the server is now able to parse and analyze the information. However valuable network resources would be expended by keeping the session open for the whole duration over the network. As the population of meters increase in the utility network, this aspect can become very costly and limiting.

The adaptation of the typical approach of reading a meter disclosed herein involves speaking a higher level protocol between the meter reading application and a meter outfitted with a networked communications module. The adaptation approach disclosed herein is described in FIG. 3. The communications module receives high level protocol requests and then, by proxy, conducts the C12.18 session with the meter. The results of the C12.18 session are used to formulate a response to the higher level protocol request. To facilitate this, the communications module is configured to be more than a simple byte pass-thru device. It is configured to be both the server side of the high level protocol and the client side of the C12.18 protocol. This high level protocol defines a set of primitives that are a straight pass-thru of the simple C12.18 read primitives. Additionally, the protocol defines higher level operations that involve a series of C12.18 protocol requests on its behalf. The response by the communications module to the high level protocol request is a collection of C12.19 data with additional prepended data. C12.19 data is not self-describing and can only be interpreted with knowledge of the C12.18 protocol requests used to acquire it. Thus, the meter reading application at the server requires additional information in order to interpret the raw C12.19 data. These additional "annotations" are developed and included in the communications module's response to the utility server.

At the end of the C12.18 data acquisition session, the meter reading application may parse the C12.19 data and perform whatever actions are required with it.

The request for information from a utility meter may be made using one or more protocols. In one presently preferred embodiment, the request and corresponding response may be made using the ANSI standards C12.18 and C12.19. The possible embodiments where the request and corresponding response use C12.18 and C12.19 is described in Example A below, in the communications flow diagram shown in FIG. 3, and in the example response shown in FIG. 4.

Example A

A meter operating according to the C12.19 standard is associated with a communications module. The communications module formats the response to the meter reading application in accordance with the C12.19 standard. As described above in connection with FIG. 2, the communications module may receive a read meter request to read data from an associated utility meter. The communication module opens a C12.18 session with the associated utility meter. The communications module sends table read requests to the utility meter. The utility meter responds with information formatted according to the C12.19 standard, which is received by the communications module. In one preferred embodiment, the communications module makes all (or multiple) data read requests to the associated meter and receives the corresponding responses from the utility meter formatted according to C12.19 before responding to the read meter request. In such an embodiment, information from the responses received from the meter are included in a single response to the read meter request, the single response being sent to the meter reading application located on the utility server or access point. The single response to the read meter request is formatted according to the C12.19 standard and includes information allowing a meter read application to associate the response with the corresponding read meter request. Preferably, the response also includes information which allows the meter reading application to interpret the data.

One preferred embodiment of the invention is described below. The meter-reading application may reside in the back-office server or in the access point of the wireless network in which all the C12.19 utility meters are situated and connected to the network via individual communications modules. A communications module is situated at each of the C12.19 meter locations to provide the network connectivity and also the network interface with the meter. The meter-reading application at the server or the access point makes the meter-reading requests to the communications module over the network. The request comes in as a data message, preferably in the form of IPv6 or IPv4 packets.

However, other types of packet protocols are equally applicable with the invention disclosed herein. This request prompts the communication module to initiate one C12.18 session over which many C12.18 primitive operations are conducted to collect the requested data. The communications module will then repackage the data with explanations, annotations, etc. to facilitate the meter-reading application at the network server to interpret the data properly. The requested data is transmitted over the wireless network to the back office server as a group of IPv4 or IPv6 packets with appropriate headers and data fields.

Figure 3:
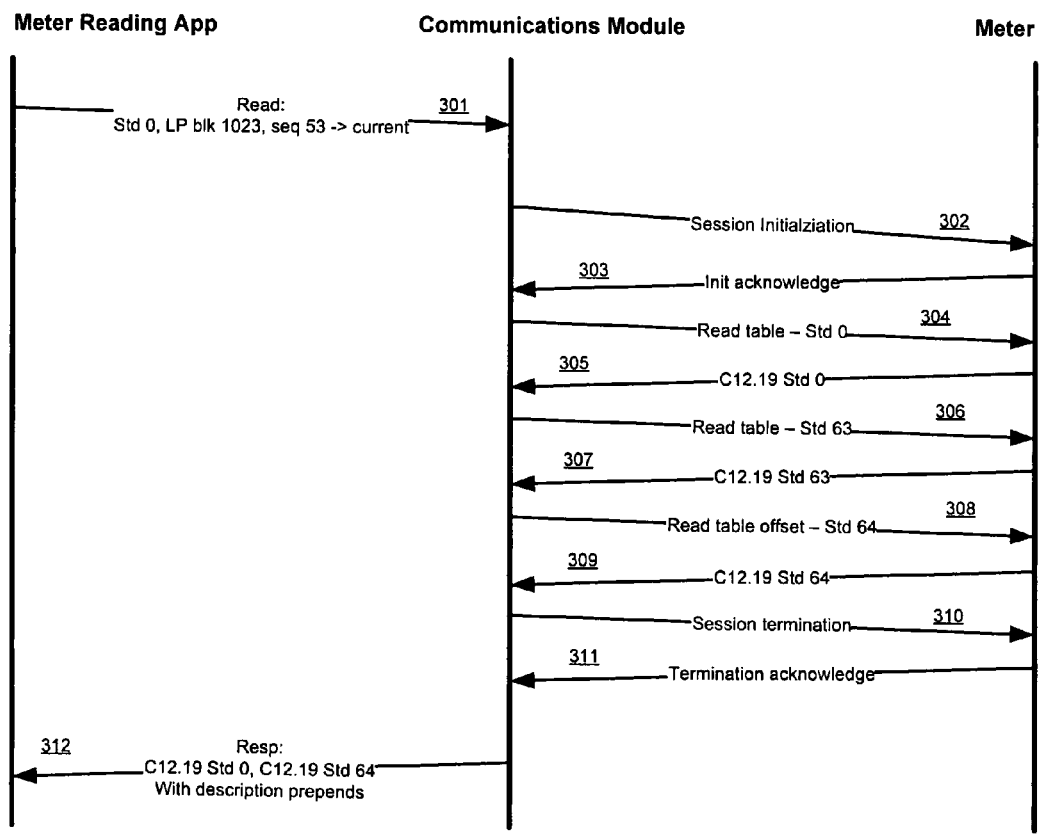
FIG. 3 is a flow diagram illustrating the communications flow during meter reading, according to one possible embodiment.

FIG. 3 describes the synchronous exchange between a meter reading application and a meter via a communications module that performs mediation and proxy functions. The meter reading application at the server sends a master C12.19 meter data request to the target communications module in message 301. This will typically be, but not limited to, in the form of IPv4 or IPv6 packet(s). These types of request messages can be interspersed by the server with requests it may be making to other communications modules or with other network operations messages. It is the communications module that initiates a "non-network" C12.18 meter-reading session with the meter to execute the requests made by the server. The communications module may implement multiple meter-reading data requests in one or more C12.18 sessions with the meter, and assemble all or portions of, the data before responding to the server. Accordingly, the communications module acts as a proxy for the utility server. The C12.18 session itself resembles the conventional C12.18 session described in the C12.18 standards, with a serial two-way exchange of request-response messages, until the session is terminated and acknowledged. The C12.18 session in the example shown in FIG. 3 is described in messages 302 through 311. After the session is completed, the communications module assembles the C12.19 meter data with appropriate annotations prepended and transmits its message 312 with the data to the server in the form of one of IPv4, IPv6, or other protocol packets. One must again note that the server can request multiple meter readings in its message to the communications module, and the communications module may respond with one or more messages after acquiring all the data requested. The key requirement is that the communications module must annotate the C12.19 data in order for the server to recognize the data forms and process them accordingly.

Figure 4:
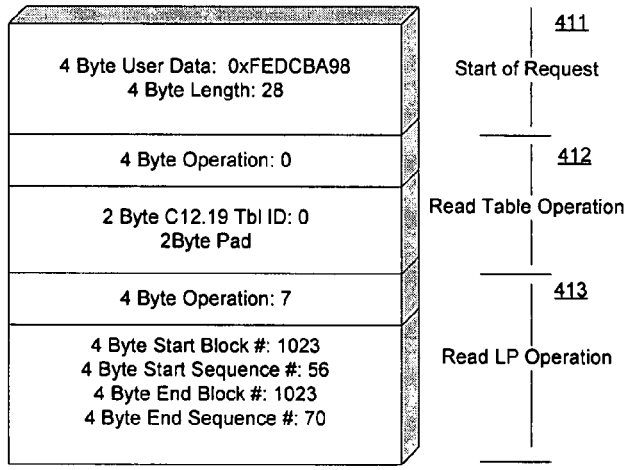
FIG. 4 is a generalized bock diagram an example of a typical utility server request for C12.19 meter data and annotated response from the communications module, according to one possible embodiment.
Figure 4:
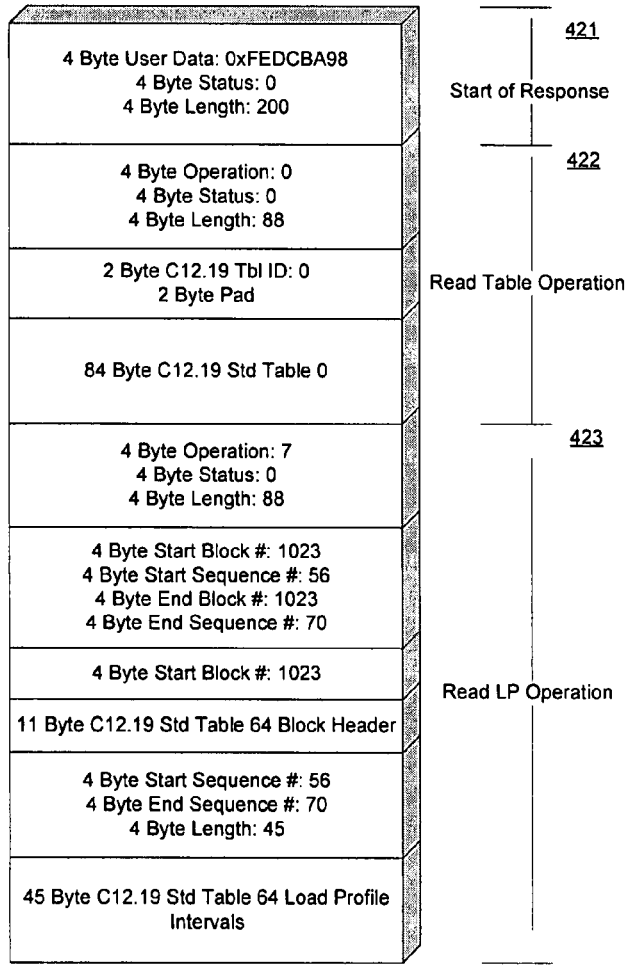

FIG. 4 provides an example of a request (for C12.19 meter reading data) and an annotated response from the communications module. This communication takes place at higher level protocol as data messages typically in the form of IP packets. A typical meter-reading request from the utility server is represented in message 410. The server is providing the preamble start of request 411 provided the needed identification data. Specific Read Table (C12.19 data table) request is shown in 412. Request relating to "Read Load Profile (LP)" operation is described in 413. There can be multiple messages of the type 410 that the utility network node may receive from the utility server. It will then conduct one or more C12.18 sessions to acquire the data from the meter per the request from the utility server. The utility network node then prepares an annotated response 420 and sends it to the utility server. The response tracks the one or more requests. In the example presented herein, 420 represents a typical response to one request. The start of response 421 preamble tracks the start of request preamble. The data in Read Table Operation 422 tracks the request and arranges the data in the sequence requested by the meter-reading application in the utility server. Similarly, Read LP Operation message 423 tracks the request 413, and arranges the Load profile data in the order requested in 413. This formatted response 420 will help the utility server to process the meter-reading information efficiently and correctly.

At the end of the data acquisition, the meter reading application at the server may parse the augmented C12.19 data and perform whatever actions are required with it.

Operations and Data Format of the Adaptation Method

An exemplary Operations and Data Format of the Adaptation Method is provided herein to describe the essence of the high-level protocol and the C12.19 data mark-up layer. The detail provided herein is only intended to help solidify the understanding of the high-level protocol as well as the possible data structures used to realize request and response packets. The example is not intended to be comprehensive and as such not limited to just this implementation.

Request Operation:

The first part of all requests is a 'Start of Request' header. It is of the form:

32 bits of data that can be set by the user (echoed back to requester)

32 bits of length (length of the entire request less this header)

This section is describing data structures that may be used within a request or response. In a header such as this one (and others below), the length of the data immediately following the header must be noted so that the parsing of the data can occur. The "32 bits of length" is the preferred number of bytes that are to follow this header.

Each request operation has a common header portion and an operation-specific portion. The common header portion is of the form:

32 bits of operation identification

The example protocol operations and their operation specific request headers are as follows:

straight C12.18 pass-thru
    read table
        16 bits of table identification
        16 bits of padding
    read table offset
        16 bits of table identification
        16 bits of length
        32 bits of offset
    read registers
        no operation specific header
    read previous season registers
        32 bit timestamp (UNIX GMT)
    read previous demand registers
        32 bit timestamp (UNIX GMT)
    read self-read registers
        32 bit start sequence #
    read load-profile
        32 bit start block #
        32 bit start sequence #
        32 bit end block #
        32 bit end sequence #
    read event log
        32 bit start sequence #
        32 bit end sequence #

Operations can be grouped together in one request. For instance, one may perform a read table operation together with a read register operation. When each request is preferably fulfilled under one C12.18 session, the read table and read register operations will be contemporary with one another.

The response:

The first part of a response is a 'Start of Response' header. It is preferably of the form:
    32 bits of data that can be set by the user (from the request)
    32 bits of request status
    32 bits of length (length of the entire response less this header)

The response operation may have a common header portion and an operation-specific portion.

The example common header portion is of the form:
    32 bits of operation identification
    32 bits of request status
    32 bits of length (length of the operation response less this header)

The example protocol operations, the operation specific response headers and the requested data may be as follows:
    straight C12.18 pass-thru
    read table
        16 bits of table identification
        16 bits of padding
        C12.19 table data
    read table offset
        16 bits of table identification
        16 bits of length
        32 bits of offset
        C12.19 table data
    read registers
        C12.19 table data (std 23)
    read previous season registers
        32 bit requested timestamp (UNIX GMT)
        C12.19 table data (std 24)
    read previous demand registers
        32 bit requested timestamp (UNIX GMT)
        C12.19 table data (std 25)
    read self-read registers
        32 bit requested start sequence #
        32 bit self-read record count
        C12.19 table data (std 26)
    read load-profile
        32 bit requested start block #
        32 bit requested start sequence #
        32 bit requested end block #
        32 bit requested end sequence #
        32 bit block #
        C12.19 table data (std 64/block header)
        32 bit start seq #
        32 bit end seq #
        32 bit length
        C12.19 table data (std 64/load profile data)
(This portion repeats as needed to fulfill the request)
    read event log
        32 bit start sequence #
        32 bit end sequence #
        32 bit event log record count
        C12.19 table data "Read Anew" Operation:

The read operations up to this point may take a couple of parameters demarking the start and end sequence numbers in the data sequences. A back-office system, over time, may gather all samples in the data set. This is preferably done by iteratively reading the meter to get the latest time-series data available since the time the previous read occurred. For each read in the iteration, knowledge of the last read sequence number is then utilized to construct a read request for the new data. An optimization that eliminates the back office system from having to maintain last-read sequence numbers involves storing the last read sequence numbers from any previous "read anew" operations on the NIC. The back office system may then only issue 'read anew' operations to acquire all the new data. This read operation may address all time-based revenue data on the meter. The 'read anew' request takes no operation-specific input parameters. In no particular order, the response is a series of run-length encoded sections. Because this operation is used to acquire new data, any particular TLV can be omitted from the response. Each section may have a header that describes the type of the data and the length of the data portion immediately following the header.

Each TLV (type, length, value) is described below:
    Previous season registers
        32 bits of type
        32 bits of length
        32 bits of previous season registers read time
        C12.19 table data
    Previous demand registers
        32 bits of type
        32 bits of length
        32 bits of previous demand registers read time
        C12.19 table data
    Self read registers
        32 bits of type
        32 bits of length
        32 bits of self-read record count
        C12.19 table data
    Load profile
        32 bits of type
        32 bits of length
        32 bits of block count
        32 bit start block #
        32 bit start sequence #
        32 bit end block #
        32 bit end sequence #
        32 bit block #
        C12.19 table data (std 64/block header)
        32 bit start seq#
        32 bit end seq#
        32 bit length
        C12.19 table data (std 64/load profile data)
(The later grouping of data is repeated as needed to capture all newly read data).
    Event log
        32 bits of type
        32 bits of length
        32 bit event log record count
        C12.19 table data For those skilled in the art, it will be obvious that the disclosed invention method is applicable to other forms of data gathering methods and protocols which require a continuous network session to me maintained. The data gathering proxy, which in the preferred embodiment is the NIC, can be equipped with the capability to conduct higher level protocol communications with the server, and also retains the ability to conduct session-oriented C12.18 protocol with the data source which in this preferred embodiment is the electric meter.

The embodiments presented herein combine sub-systems and functionalities to illustrate the presently preferred embodiments. Alternative embodiments may include fewer or additional sub-systems, processes, or functional aspects, or may be used with other sub-systems, processes, or functional aspects, depending on the desired implementation. Various features and advantages of the present invention are set forth in the following claims.

What is claimed is:

1. A system associated with a utility network, the system comprising:
   a plurality of utility meters capable of reading commodity meter information;
   a plurality of utility network nodes arranged in a utility network and capable of interfacing with the utility meters and receiving the commodity meter information from the utility meters and transferring that information to a pre-specified network address;
   wherein at least one of the utility nodes, in response to receiving a read meter request from a meter read program in accordance with a first data communication protocol:
      initiates a session with the at least one utility meter in accordance with a second data communication protocol distinct from the first data communication protocol, said session comprising a serial two-way exchange of a plurality of message pairs between the at least one utility node and the at least one utility meter, where each message pair respectively comprises (i) an operation-specific meter data request that is sent to the at least one utility meter from the at least one utility node, and (ii) a reply to the meter data request that is sent to the at least one utility node from the at least one utility meter and individually responsive to a corresponding one of the operation-specific meter read requests, such that the at least one utility node receives, from the least one utility meter, a plurality of different replies each individually responsive to a corresponding one of a plurality of individual meter data requests, respectively,
      at the termination of the session, formats the plurality of received replies to the meter data requests into a meter read request response that contains an indication of a correspondence between each individual received reply and the individual meter data request to which that received reply is responsive, respectively, and
      transmits the formatted meter read request response to a pre-specified network address associated with the read meter request received from the meter read program.

2. The system of claim 1 wherein the utility network node is capable of engaging the utility meter it is associated with in an off-net or on-net session involving two-way exchange of request/reply messages according to a pre-designated format of the second data communication protocol.

3. The system of claim 1 wherein the format of the meter read request response is based on either ANSI C12.19 or C12.18.

4. The system of claim 1 wherein the protocol used by the utility network in the session with the utility meter operating in a C12.19 format is based on the ANSI 12.18 protocol format.

5. The system of claim 4 wherein the first data communication protocol used by the utility server and the utility node in exchanging messages regarding meter-reading requests includes a definition of a set of primitives that are a simple pass-thru of read primitives of the C12.18 protocol format.

6. The system of claim 5 wherein the indication in the formatted meter read request response includes annotation information for use in interpreting the commodity meter information included in the transmitted meter read request response.

7. The system of claim 5 wherein the message with the meter read data request sent by the server to the utility network node in accordance with the first data communication protocol may be in the form of one of IPv4 or IPv6.

8. The system of claim 5, wherein the message with the meter read request response sent by the utility network node to the server in accordance with the first data communication protocol may be in the form of one of IPv4 or IPv6.

9. The system of claim 5 wherein the pre-specified network address associated with the received meter read request corresponds to a utility server.

10. The system of claim 5 wherein the pre-specified network address associated with the received meter read request corresponds to an access point to the utility network, and wherein the meter reading program resides on the access point associated with the network address.

11. The system of claim 5 wherein the data collected by the utility network node via one or more C12.18 sessions with the commodity meter is based on a set of TLV vales (time, length, value) data elements.

12. The system of claim 11 wherein the response message from the utility network node to the utility server includes the requested data as a series of run-length encoded sections with an option for omitting any particular TLV from the response, and includes a header that describes the type of data and the length of the data portion immediately following the header.

13. A method of responding to a request to read a utility meter, comprising:
   receiving, in accordance with a first data communication protocol, a meter read request from a meter reading application by a communication node associated with a utility meter;
   initiating a session with a utility meter in accordance with a second data communication protocol distinct from the first data communication protocol, the session being between the communications module and the utility meter, the session comprising:
      making a plurality of operation-specific data requests to the utility meter by the communications module; and
      receiving, at the communications module, a plurality of replies from the utility meter that are each individually responsive to a corresponding one of the operation-specific meter data requests, such that the communications module receives, from the utility meter, a plurality of different replies individually responsive to a corresponding one of the plurality of operation-specific data requests, respectively;
   at the termination of the session, formatting a response to the read meter request from the meter reading application by the communications module, the response containing the received replies formatted with an indication of a correspondence between each individual received reply and the individual meter data request to which that received reply is individually responsive, respectively; and
   transmitting the formatted response to the meter reading application.

14. The method of claim 13, wherein the received meter read request from a meter reading application is compliant with C12.18.

15. The method of claim 14, wherein the utility meter is a C12.19 compliant utility meter, and wherein the plurality of data requests to the C12.19 compliant utility meter are C12.18 compliant.

16. The method of claim 15, wherein the utility network communication node is capable of conducting a standalone C12.18 session with the C12.19 compliant utility meter.

17. The method of claim 15, wherein the formatted response to the meter reading application includes annotation information that describes the content of the formatted response for use by the meter reading application in interpreting the response.

18. A communications module for use in a utility network, comprising:
   an interface to a utility meter,
   a memory for storing instructions;
   a processor for processing instructions; and
   an RF radio for communicating with a meter reading application using an RF network in accordance with a first data communication protocol,
   wherein the processor executes the instructions of:
      initiating, in accordance with a second data communication protocol distinct from the first data communication protocol, a session with a utility meter in response to a received meter read request transmitted from a meter reading application in accordance with the first data communication protocol, the session comprising making a plurality of operation-specific data requests to the utility meter and receiving a plurality of replies from the utility meter that are each individually responsive to a corresponding one of the operation-specific meter data requests, such that the communications module receives, from the utility meter, a plurality of different replies individually responsive to a corresponding one of the plurality of operation-specific data requests, respectively;
      upon termination of the session, formatting a response to the read meter request from the meter reading application by the communications module, the response containing the received replies formatted with an indication of a correspondence between each reply to the communications module and the individual meter data request made by the communications module to which that received reply is responsive, respectively; and
      transmitting the formatted response to the meter reading application.

19. The communications module of claim 18, wherein the received meter read request from a meter reading application is compliant with C12.18.

20. The communications module of claim 19, wherein the utility meter is a C12.19 compliant utility meter, and wherein the plurality of data requests to the C12.19 compliant utility meter are C12.18 compliant.

21. The communications module of claim 20, wherein the utility network node interface is capable of conducting a standalone C12.18 session with the C12.19 compliant utility meter.

22. The communications module of claim 20, wherein the indication in the formatted response to the meter reading application includes annotation information that describes the content of the formatted response for use by the meter reading application in interpreting the response.

23. The communications module of claim 20, wherein the RF radio transmits messages using IP based protocols.

24. The communications module of claim 20, wherein the IP based protocols include at least one of the protocols IPv6 or IPv4.

25. The communications module of claim 20 wherein the RF radio receives meter reading data requests from the meter reading application in an IP protocol format.

26. The communications module of claim 20 wherein the IP based protocols include at least one of the protocols IPv6 and or IPv4.

* * * * *